(12) United States Patent
Gorra

(10) Patent No.: US 10,745,215 B2
(45) Date of Patent: Aug. 18, 2020

(54) PORT ARRANGEMENT FOR NONCONTACT SUPPORT PLATFORM

(71) Applicant: Core Flow Ltd., Daliyat el-Karmel (IL)

(72) Inventor: Rina Gorra, Yoqneam Illit (IL)

(73) Assignee: Core Flow Ltd., Daliyat el-Karmel, Israe ( * ) Notice: Subject to any disclaimer, the term of this patent is extended or adjusted under 35 U.S.C. 154(b) by 0 days.

(21) Appl. No.: 16/233,140

(22) Filed: Dec. 27, 2018

(65) Prior Publication Data

US 2020/0207555 A1 Jul. 2, 2020

(51) Int. Cl.
*B65G 51/03* (2006.01)
*B65G 49/06* (2006.01)

(52) U.S. Cl.
CPC ........... *B65G 49/065* (2013.01); *B65G 51/03* (2013.01); *B65G 2249/04* (2013.01)

(58) Field of Classification Search
CPC .. B65G 51/03; B65G 49/065; B65G 2207/06; H01L 21/67784
USPC ............. 406/88–89; 414/676; 271/3.23, 195; 65/25.1, 25.2
See application file for complete search history.

(56) References Cited

U.S. PATENT DOCUMENTS

| | | | | |
|---|---|---|---|---|
| 5,122,016 A * | 6/1992 | Lenhart | ................... | B65G 51/03 406/86 |
| 7,269,475 B1 * | 9/2007 | Hogg | ..................... | B65H 5/228 406/19 |
| 7,464,929 B2 * | 12/2008 | Hachmann | .............. | B41F 21/00 101/230 |
| 2003/0146340 A1 * | 8/2003 | Ebner | .................... | B65H 29/52 242/615.11 |
| 2006/0284356 A1 * | 12/2006 | Lim | ....................... | B65G 51/03 269/20 |
| 2007/0228630 A1 * | 10/2007 | Grundmuller | .......... | C03B 33/03 269/71 |
| 2014/0161577 A1 * | 6/2014 | Richman | ................ | B65G 51/03 414/676 |
| 2017/0167020 A1 * | 6/2017 | Granneman | .......... | C23C 16/455 |
| 2019/0193955 A1 * | 6/2019 | Lautman | ............. | B65G 49/06 |
| 2019/0381635 A1 * | 12/2019 | Nishri | .................... | B65G 51/03 |

* cited by examiner

*Primary Examiner* — Joseph A Dillon, Jr.
(74) *Attorney, Agent, or Firm* — Pearl Cohen Zedek Latzer Baratz LLP

(57) ABSTRACT

A noncontact support platform system is configured to support a workpiece and includes pressure ports and vacuum ports that are interspersed on a top surface of a table. The ports are arranged along columns such that a pressure port alternates with a vacuum port along each column. The columns include at least one longitudinal column that is oriented substantially parallel to a direction of motion of the workpiece. Mutually parallel rotated columns are each oriented at an oblique angle to the direction of motion. At least one transition column is located between a longitudinal column and its proximal rotated column and has an orientation that is intermediate between the two columns that are adjacent to that transition column. Each vacuum port and pressure port is located at an intersection of a column with a row that is oriented substantially perpendicular to the direction of motion.

13 Claims, 6 Drawing Sheets

PORT ARRANGEMENT FOR NONCONTACT SUPPORT PLATFORM

FIELD OF THE INVENTION

The present invention relates to noncontact support platforms. More particularly, the present invention relates to an arrangement of ports for inflow and outflow of air on a table of a noncontact support platform.

BACKGROUND OF THE INVENTION

Noncontact support platforms are useful in processes that require supporting and transporting of thin, and typically fragile, workpieces, where contact of the workpiece with solid surfaces is to be avoided. For example, a thin workpiece may include a thin pane of glass, e.g., for incorporation into a display screen, or another thin material. The process may include application of a substance or tool to the workpiece, or inspection of the workpiece.

A typical noncontact support platform includes a table whose horizontal top surface is made to be extremely flat. The table top includes an arrangement of openings. Some of the openings (e.g., approximately half of the openings) are pressure openings out of which air is blown to form an air cushion on which the workpiece may be supported above the table top. The remaining openings are air return openings through which air may flow from the air cushion and into the table.

When precise control of the distance between the workpiece and the table top is not required, the air return openings may open to atmospheric pressure. However, where the distance between the workpiece and the table top is to be controlled precisely, vacuum may be applied to the air return openings. Uniformity of the distribution of the various air openings over the table top may contribute to precision the height of the workpiece. In addition, such uniformity may also enable uniform convective heat transfer throughout the workpiece, thus facilitating a uniform temperature at all parts of the workpiece.

SUMMARY OF THE INVENTION

There is thus provided, in accordance with an embodiment of the present invention, a noncontact support platform system that is configured to support a workpiece, the system including: a plurality of pressure ports and vacuum ports that are interspersed on a top surface of a table, each pressure port configured to connect to a source of air pressure to enable an outflow of air through that pressure port, and each vacuum port configured to connect to a source of suction to enable an inflow of air through that vacuum port, the pressure ports and vacuum ports arranged along a plurality of columns such that a pressure port of the plurality of pressure ports alternates with a vacuum port of the plurality of vacuum ports along each column of the plurality of columns, wherein the plurality of columns includes: at least one longitudinal column that is oriented substantially parallel to a direction of motion of the workpiece over the table; a plurality of mutually parallel rotated columns that are each oriented at an oblique angle to the direction of motion; and at least one transition column located between the at least one longitudinal column and its proximal rotated column of the plurality of rotated columns that is proximal to the at least one longitudinal column, each transition column of the at least one transition column oriented at an orientation that is intermediate between the two columns of the plurality of columns that are adjacent to that transition column, wherein each vacuum port and each pressure port is located at an intersection of a column of the plurality of columns with a row of a plurality of rows that are each oriented substantially perpendicular to the direction of motion such that a pressure port of the plurality of pressure ports alternates with a vacuum port of the plurality of vacuum ports along each row of the plurality of rows.

Furthermore, in accordance with an embodiment of the present invention, a distance R between a pair of adjacent rotated columns of the plurality of rotated columns is substantially equal to the distance between any other pair of adjacent rotated columns of the plurality of rotated columns.

Furthermore, in accordance with an embodiment of the present invention, a distance between an intersection of the at least one longitudinal column with an end row of the plurality of rows and an intersection of a proximal rotated column of the plurality of rotated columns is equal to an integral multiple of the distance R.

Furthermore, in accordance with an embodiment of the present invention, a minimum distance between an intersection of each transition column of the at least one transition column with an end row of the plurality of rows and an intersection with that end row of a column of the plurality of columns that is adjacent to that transition column is limited by a minimum allowed spacing between adjacent ports.

Furthermore, in accordance with an embodiment of the present invention, the plurality of rotated columns are located between two bounding longitudinal columns of the at least one longitudinal column.

Furthermore, in accordance with an embodiment of the present invention, a number of the transition columns between one bounding longitudinal column of the two bounding longitudinal columns and its proximal rotated column of the plurality of rotated columns is equal to a number of the transition columns between the other bounding longitudinal column and its proximal rotated column of the plurality of rotated columns.

Furthermore, in accordance with an embodiment of the present invention, a number of the transition columns between one bounding longitudinal column of the two bounding longitudinal columns and its proximal rotated column of the plurality of rotated columns is different from a number of the transition columns between the other bounding longitudinal column and its proximal rotated column of the plurality of rotated columns.

Furthermore, in accordance with an embodiment of the present invention, a distance between an intersection with a first end row of the plurality of rows with one bounding longitudinal column of the two bounding longitudinal columns and an intersection of the first end row with a rotated column of the plurality of rotated columns that is proximal to the one bounding longitudinal column is equal to a distance between an intersection with a second end row of the plurality of rows with the other bounding longitudinal column of the two bounding longitudinal columns and an intersection of the second end row with a rotated column of the plurality of rotated columns that is proximal to the other bounding longitudinal column.

Furthermore, in accordance with an embodiment of the present invention, a distance between an intersection with a first end row of the plurality of rows with one bounding longitudinal column of the two bounding longitudinal columns and an intersection of the first end row with a rotated column of the plurality of rotated columns that is proximal to the one bounding longitudinal column is different from a distance between an intersection with a second end row of the plurality of rows with the other bounding longitudinal column of the two bounding longitudinal columns and an intersection of the second end row with a rotated column of the plurality of rotated columns that is proximal to the other bounding longitudinal column.

Furthermore, in accordance with an embodiment of the present invention, some rotated columns of the plurality of rotated columns are located on one side of a longitudinal column of the at least one longitudinal column, and other rotated columns of the plurality of rotated columns are located on an opposite side of that longitudinal column.

Furthermore, in accordance with an embodiment of the present invention, the at least one longitudinal column includes a plurality of adjacent longitudinal columns.

There is further provided, in accordance with an embodiment of the present invention, a method for designing a noncontact support platform system that is configured to support a workpiece, a table of the system including a plurality of pressure ports and vacuum ports that are interspersed on a top surface of the table, each pressure port configured to enable an outflow of air through that pressure port and each vacuum port configured to enable an inflow of air through that vacuum port, the pressure ports and vacuum ports arranged along a plurality of rows that are each substantially perpendicular to a direction of motion of the workpiece over the table and such that a pressure port of the plurality of pressure ports alternates with a vacuum port of the plurality of vacuum ports along each row of the plurality of rows, the method including: determining placement on the table of a plurality of columns such that each vacuum port and each pressure port is located at an intersection of a row of the plurality of rows with a column of the plurality of columns such that a pressure port of the plurality of pressure ports alternates with a vacuum port of the plurality of vacuum ports along each column of the plurality of columns, the determining of the placement including: determining a placement of at least one longitudinal column of the plurality of columns, the at least one longitudinal column oriented substantially parallel to the direction of motion; determining a constant column spacing between each pair of rotated columns of a plurality of mutually parallel rotated columns that are each oriented at an oblique angle to the direction of motion; determining a minimum spacing between adjacent pressure ports and vacuum ports along an end row of the plurality of rows; and determining a placement of at least one transition column located between the at least one longitudinal column and a proximal rotated column of the plurality of rotated columns, each transition column of the at least one transition column oriented at an orientation that is intermediate between the two columns of the plurality of columns that are adjacent to that transition column, wherein a distance between an intersection of each transition column of the at least one transition column with each row of the plurality of rows and an intersection with that row of a column of the plurality of columns that is adjacent to that transition column is at least as large as the determined minimum spacing.

Furthermore, in accordance with an embodiment of the present invention, determining the placement of at least one longitudinal column includes locating a longitudinal column of the at least one longitudinal column at a predetermined distance from a lateral side of the table.

Furthermore, in accordance with an embodiment of the present invention, determining the placement of at least one longitudinal column includes locating a longitudinal column of the at least one longitudinal column at an expected position of a lateral edge of the workpiece.

Furthermore, in accordance with an embodiment of the present invention, determining the placement of at least one longitudinal column includes locating a longitudinal column of the at least one longitudinal column such that a distance between an intersection of the at least one longitudinal column with an end row of the plurality of rows and an intersection of a proximal rotated column of the plurality of rotated columns is equal to an integral multiple of the constant column spacing.

Furthermore, in accordance with an embodiment of the present invention, determining the placement of at least one longitudinal column includes locating two longitudinal columns of the at least one longitudinal column on opposite sides of the plurality of rotated columns.

Furthermore, in accordance with an embodiment of the present invention, determining the placement of at least one longitudinal column includes locating the at least one longitudinal column between rotated columns of the plurality of rotated columns.

Furthermore, in accordance with an embodiment of the present invention, determining the placement of at least one longitudinal column includes locating a plurality of longitudinal columns of the at least one longitudinal column adjacent to one another.

There is further provided, in accordance with an embodiment of the present invention, a noncontact support platform system that is configured to support a workpiece, the system including: a plurality of pressure ports and evacuation ports that are interspersed on a top surface of the table, each pressure port configured to connect to a source of air pressure to enable an outflow of air through that pressure port, and each evacuation port configured to open to ambient atmospheric pressure to enable an inflow of air through that evacuation port, the pressure ports and evacuation ports arranged along a plurality of columns such that a pressure port of the plurality of pressure ports alternates with an evacuation port of the plurality of evacuation ports along each column, each vacuum port and each pressure port being located at an intersection of a column of the plurality of columns with a row of a plurality of rows that are each oriented substantially perpendicular to the direction of motion, wherein the plurality of columns includes: at least one longitudinal column that is oriented substantially parallel to a direction of motion of the workpiece over the table; a plurality of mutually parallel rotated columns that are each oriented at an oblique angle to the direction of motion; and at least one transition column located between the at least one longitudinal column and its proximal rotated column of the plurality of rotated columns that is proximal to the at least one longitudinal column, each transition column of the at least one transition column oriented at an orientation that is intermediate between the two columns of the plurality of columns that are adjacent to that transition column, wherein along a row of the plurality of rows that is intersected by all transition columns of the at least one transition column, a pressure port of the plurality of pressure ports alternates with an evacuation port of the plurality of evacuation ports.

Furthermore, in accordance with an embodiment of the present invention, a transition column of the at least one transition column does not intersect at least one row of the plurality of rows.

BRIEF DESCRIPTION OF THE DRAWINGS

In order for the present invention to be better understood and for its practical applications to be appreciated, the following Figures are provided and referenced hereafter. It should be noted that the Figures are given as examples only and in no way limit the scope of the invention. Like components are denoted by like reference numerals.

DETAILED DESCRIPTION OF THE INVENTION

Figure 1:
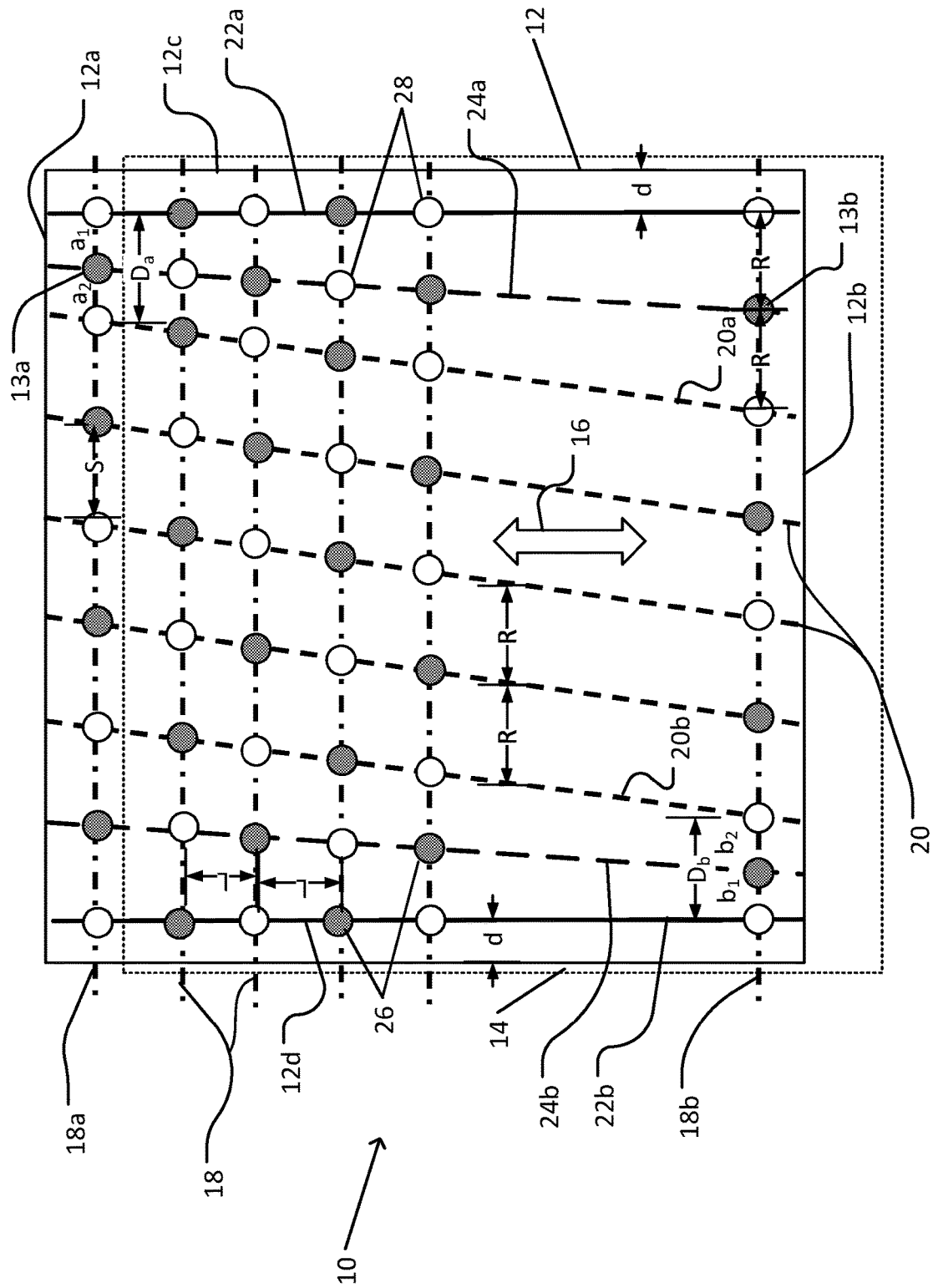
FIG. 1 schematically illustrates an arrangement of pressure ports and vacuum ports on a table top of a noncontact support platform, in accordance with an embodiment of the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, the conjunction "or" as used herein is to be understood as inclusive (any or all of the stated options).

In accordance with an embodiment of the present invention, a noncontact support platform is configured to support a thin workpiece on an air cushion as the workpiece travels along a predetermined direction of travel. The noncontact support platform includes a flat table top on which are arranged a plurality of alternating pressure ports and vacuum ports arranged in parallel rows that are substantially perpendicular to the direction of travel. When the noncontact support platform is in operation to support the workpiece, air flows out of the table and into the air cushion through each of the pressure ports. Similarly, air is drawn from the air cushion and into the table through each of the vacuum ports.

Reference herein to a direction of motion should be understood as referring to a nominal or intended general direction of motion of a workpiece along the table. In some cases, actual motion of a workpiece may include deliberate or unintended lateral deviations from the general direction of motion.

Each port in each row is located at an intersection between the row and one of a plurality of columns. Each column may be substantially parallel to the direction of travel or sloped at an acute angle to the direction of travel. The ports along each column also alternate between pressure ports and vacuum ports. Thus, the intersections of columns and rows form a non-uniform grid with the ports located at nodes or intersections of the grid.

It should be understood that, although a typical noncontact support platform operates by causing a flow of air through the pressure ports and vacuum ports, in some cases, other gasses or fluids may be used. Reference herein to "air", "airflow", "air cushion", or similar terms should be understood as including any other such gas or fluid.

In most regions of the table top, the columns are parallel to one another and are oriented at an oblique angle, e.g., an acute angle, to the direction of travel. In these regions, the distance between adjacent columns is constant. (As used herein, two neighboring columns of any type are considered to be adjacent when there are no other intervening columns of any type located between them.) This rotated orientation of these columns (referred to herein as rotated columns) may result in a more uniform distribution of forces on the workpiece than would an arrangement where all of the columns are parallel to the direction of motion.

At some regions of the table top, one or more of the columns are longitudinal columns that are substantially parallel to the direction of motion and are orthogonal to the rows. For example, the longitudinal columns may be located near an edge of the table top, or at the expected position of an edge of the workpiece. In some cases, one or more longitudinal columns may be located at a midline of the table top or at an expected position of a midline of the workpiece, or at another interior position (e.g., not near an edge) of the table top or workpiece. Inclusion of such longitudinal columns that are parallel to the direction of motion may result in a more uniform distribution of forces on the workpiece at edges of the workpiece that would an arrangement that included only the rotated columns.

At transition regions between the longitudinal columns and the mutually parallel rotated columns, the ports may be arranged along one or more transition columns. These transition columns are at orientations intermediate between the orientation of the longitudinal columns and the orientation of the rotated columns. The orientation of a single transition column is intermediate between the two columns that are adjacent to that transition column. The adjacent columns may be two other transition columns, a rotated column and a longitudinal column, or another transition column and either an longitudinal column or a rotated column.

Typically, each set of rotated columns is bounded on both lateral sides (e.g., sides that are perpendicular to the direction of motion) by longitudinal columns, referred to herein as bounding longitudinal columns. Thus, at a longitudinal side (used herein to refer to a side of the table top that is perpendicular to the direction of motion, e.g., that is crossed by the workpiece during its motion), one of bounding longitudinal columns sides is closer to an end of a rotated column than is the opposite bounding longitudinal column. At the opposite longitudinal side, the opposite bounding longitudinal column is closer to an end of the rotated column at the opposite lateral side of the region with rotated columns. In the following discussion, a rotated column whose end is closest to one of the bounding longitudinal columns is referred to as a proximal rotated column to that bounding longitudinal column.

The plurality of rows are bounded by two end rows that are each closest to each of the opposite longitudinal sides of the table top. A distance between each of the bounding longitudinal columns and its proximal rotated column is smallest at one of the end rows, referred to herein as a starting end row of that bounding longitudinal column. Each of the opposite bounding longitudinal columns is associated with a starting end row at opposite longitudinal sides of the table top. At each end row, one or more ports of the transition columns are located between a bounding longitudinal column and its proximal rotated column. Since the bounding longitudinal column is nearest to the proximal rotated column at its starting end row, a maximum number port of transition columns that may be inserted between that bounding longitudinal column and its proximal rotated column, or, equivalently, a minimum distance between adjacent ports on the starting end row, may be limited. For example, a limitation may result from one or more considerations including geometric considerations (e.g., radius or size of each port, or of structure, such as conduits, valves, or other structure, that is related to the port), engineering considerations (e.g., strength and properties of material separating the ports), economic (e.g., costs of precision machining), or other considerations.

A constant spacing between adjacent rotated columns may be determined, e.g., on the basis of a desired uniformity of the air cushion of the noncontact support platform. Similarly, a number and placement of longitudinal columns may be determined, e.g., on the basis of expected sizes of workpieces that are expected to be supported by the noncontact support platform.

A number of transition columns may be determined on the basis of the above considerations of minimum port spacing, the constant spacing, and the placement of the longitudinal columns. The transition columns may extend from ports that are inserted at the end row between the longitudinal column and its proximal rotated column. The orientations of the transition columns may fan out from the inserted ports, e.g., at orientations that are intermediate between the orientation of the longitudinal column and the orientation of its proximal rotated column.

A configuration of the ports on the table top may be parameterized by several parameters. Characterizing parameters may include a distance d between a bounding longitudinal column and the nearest lateral side of the table top, a spacing R between adjacent rotated columns, a number N of transition columns between the bounding longitudinal column and the proximal rotated column, a distance D between the bounding longitudinal column and the proximal rotated column (which in some cases may be an integral multiple of spacing R), and an orientation S of the rotated columns expressed as a lateral displacement of an end of the rotated column at one of the end rows relative to the position of the opposite end of the rotated column at the opposite end row (expressed as a multiple of R). Distances between a port of a transition column at a starting end row (between the bounding longitudinal column and the proximal rotated column) and an adjacent port (e.g., either of another transition column or of the bounding longitudinal column or proximal rotated column) may be expressed as $a_i$ (i=1, 2, 3 . . . ) at one of the end rows (e.g., for transition columns on one lateral side of the rotated columns), and as $b_i$ at the opposite end row (e.g., for transition columns on the opposite lateral side of the rotated columns).

An arrangement of ports on a table top of a noncontact support platform that includes longitudinal columns, mutually parallel rotated columns, and transition columns may be advantageous over other arrangements of ports.

For example, when ports are arranged only along columns that are parallel to the direction of motion, the rate of convective heat transfer due to the impinging jet from the ports along those parallel columns could be significantly larger than the rate of convective heat transfer in the laminar or turbulent flow between the columns. Thus, those regions (e.g., strips) that overlie the columns might experience higher rates of heat transfer than those regions that overlie regions of the table top between the ports. The resulting possible differences in temperature of the workpiece between regions that overlie the columns of ports and those regions that overlie the longitudinal regions without ports could affect temperature-sensitive processes that are applied to the workpiece.

On the other hand, simply rotating all of the columns, although providing for greater uniformity of convective heat transfer, could result in regions, e.g., near edges of a supported workpiece, where there are no ports or that are most closely neighbored by two or more ports of a single type (e.g., pressure or vacuum), An arrangement of ports as described herein, that includes longitudinal columns, mutually parallel rotated columns, and transition columns, may provide for uniform convective heat transfer while eliminating or reducing regional nonuniformity in port distribution.

An arrangement of ports as described herein may satisfy one or more criteria for a preferred arrangement of ports. Such criteria may include gradual monotonic change in distances between adjacent ports, avoidance of abrupt changes in areas between ports, and preservation of a uniform alternation between types of ports (thus avoiding regions on the table that are surrounded by a single type of port).

FIG. 1 schematically illustrates an arrangement of pressure ports and vacuum ports on a table top of a noncontact support platform, in accordance with an embodiment of the present invention.

Noncontact support platform 10 is configured to hold a flat workpiece 14 at a constant distance from (typically above) noncontact support platform table 12 (representing a top surface of the table). Noncontact support platform 10 is configured to enable workpiece 14 to be transported along direction of motion 16.

Noncontact support platform table 12 includes a plurality of pressure ports 28 that are each connected to a pressure source (e.g., a blower or other source of pressurized air, e.g., via one or more conduits or manifolds). A plurality of vacuum ports 26 are interspersed with pressure ports 28. Each vacuum port 26 is connected to a source of vacuum or suction (e.g., an exhaust blower or pump, e.g., via one or more conduits or manifolds).

For the sake of clarity, no ports are shown in much of the bottom half of noncontact support platform table 12 in FIG. 1 (except in end row 18b). Also, it should be understood that, in a typical noncontact support platform 10, the density of vacuum ports 26 and pressure ports 28 relative to the sizes of noncontact support platform table 12 and workpiece 14 is typically much greater than shown in FIG. 1. Typical sizes of vacuum ports 26 and of pressure ports 28 relative to typical sizes of noncontact support platform table 12 and of workpiece 14 may be much smaller than shown in FIG. 1.

It should be noted that noncontact support platform table 12 may represent an entire table of noncontact support platform 10, a section of a table, a module that may be placed adjacent to or connected to similar modules to form a single table, or otherwise.

Pressure ports 28 and vacuum ports 26 are arranged in a plurality of rows 18 that are oriented substantially perpendicular to direction of motion 16. Along each row 18, pressure ports 28 are alternated with vacuum ports 26, such that each pair of nearest vacuum ports 26 along a row 18 is separated by a pressure port 28, and each pair of nearest pressure ports 28 is separated by a vacuum port 26.

End rows 18a and 18b are located at longitudinal sides 12a and 12b, respectively, of noncontact support platform table 12. In the example shown, all pairs of adjacent rows 18 are separated by an identical row separation distance L. In other examples, the row separation distance may vary for at least some pairs of adjacent rows 18.

Each vacuum port 26 and pressure port 28 is located at an intersection between a row 18 and a column. The columns include longitudinal columns 22, rotated columns 20, and transition columns 24 (e.g., transition columns 24a and 24b). Along each column, pressure ports 28 are alternated with vacuum ports 26, such that each pair of nearest vacuum ports 26 along a column is separated by a pressure port 28, and each pair of nearest pressure ports 28 is separated by a vacuum port 26.

Rotated columns 20 are mutually parallel and equally spaced such that adjacent rotated columns 20 are separated by column separation distance R. Each rotated column 20 is oriented at an oblique angle to direction of motion 16. Rotated columns 20 are spaced between proximal rotated column 20a, located closest to lateral side 12c of noncontact support platform table 12, and proximal rotated column 20b, located closest to lateral side 12d. The orientation, tilt, or slope of each rotated column 20 relative to direction of motion 16 may be parameterized by S, the displacement along an axis parallel to a row 18 of an intersection of rotated column 20 at end row 12a relative from the position of the intersection of that rotated column 20 with end row 12b.

In the example shown, each of longitudinal columns 22a and 22b is located at a distance d from an adjacent lateral side 12c or 12d, respectively, of noncontact support platform table 12. In other examples, longitudinal columns 22 may be located elsewhere on noncontact support platform table 12. Each longitudinal column 22a or 22b is oriented substantially parallel to direction of motion 16. Distance d may be determined by a designer of a specific noncontact support platform 10, e.g., on the basis of various design considerations (e.g., machining accuracy, strength of materials, expected size range of workpiece 14, fluidic flow considerations, or other considerations).

In the example shown, a single transition column 24a or 24b (N=1) is located between each longitudinal column 22a or 22b and its proximal rotated column 20a or 20b, respectively. In other examples, two or more transition columns 24 may be located between a longitudinal column and its proximal rotated column.

In the example shown, end port 13a at the intersection of transition column 24a and end row 18a (the starting end row of longitudinal column 22a) is located at a transition column separation distance $a_1$ from longitudinal column 22a, and at a transition column separation distance $a_2$ from its proximal rotated column 20a (the proximal rotated column to longitudinal column 22a). The intersection of longitudinal column 22a with end row 18a is located at distance $D_a$ from the intersection of proximal rotated column 20a with end row 18a. In the example shown, $a_1+a_2=R$ (e.g., $D_a=R$). The minimal lengths of transition column separation distances $a_1$ and $a_2$ may be determined in accordance with one or more structural or other considerations, including the diameters of pressure ports 28 and vacuum ports 26. End port 13b at the intersection of transition column 24a and end row 18b is separated from each of longitudinal column 22a and proximal rotated column 20a by column separation distance R. Thus, at end row 18b, the separation between adjacent columns is identical to the separation between adjacent rotated columns 20, while at end column 18a, the separation (in the example shown) is about one half of column separation distance R.

Similarly, the intersection of longitudinal column 22b with end row 18b is located at distance $D_b$ from the intersection of proximal rotated column 20b with end row 18b. On the example shown, transition column 24b at end row 18b (the starting end row of longitudinal column 22b) is separated from longitudinal column 22b by transition column separation distance $b_1$, and is separated from proximal rotated column 20b by transition column separation distance $b_2$, where $b_1+b_2=D_b=R$. At end row 18a, transition column 24b is separated from each of longitudinal column 22b and proximal rotated column 20b by column separation distance R.

Other variants of these configurations are possible.

Figure 2:
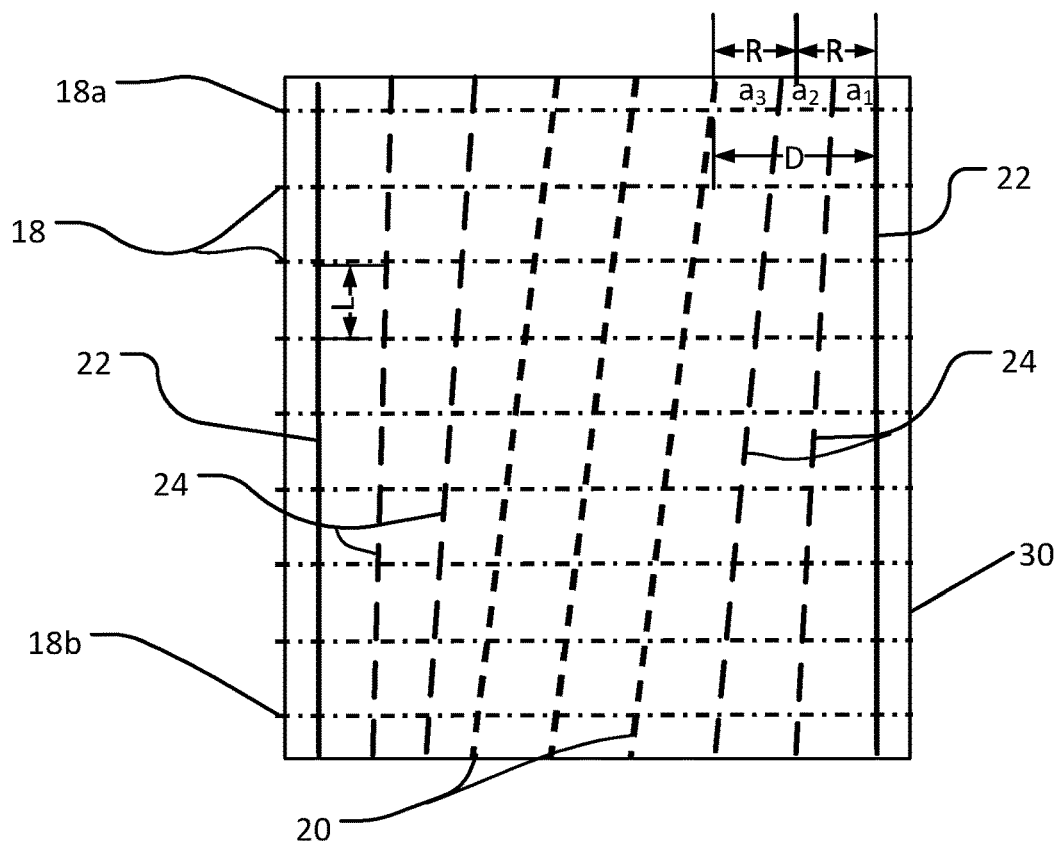
FIG. 2 schematically illustrates a variant of the table top of a noncontact support platform shown in FIG. 1, in which two transition columns are inserted between each longitudinal column and the rotated columns.

FIG. 2 schematically illustrates a variant of the table top of a noncontact support platform shown in FIG. 1, in which two transition columns are inserted between each longitudinal column and the rotated columns.

For the sake of clarity, in FIG. 2 through FIG. 7, the ports at the intersections between the rows and the columns have not been shown.

In noncontact support platform table 30, two transition columns 24 are inserted between each longitudinal column 22 and rotated columns 20 (N=2). In the example shown, the distance $D_a$ or $D_b$ between each longitudinal column 22 and its proximal rotated column 20 at end row 18a or 18b, respectively, is equal to twice the column separation distance R. The sum of transition column separation distances $a_1+a_2+a_3=D_a$. In some cases, transition column separation distances may be equal to one another ($a_1=a_2=a_3$), while in other cases, they are not equal. In the example shown, $a_1+a_2+a_3=D=2R$. In other cases, $D \neq 2R$ (e.g., $D<2R$ or $D>2R$).

In some cases, the separation distance between adjacent rows 18 may vary.

Figure 3:
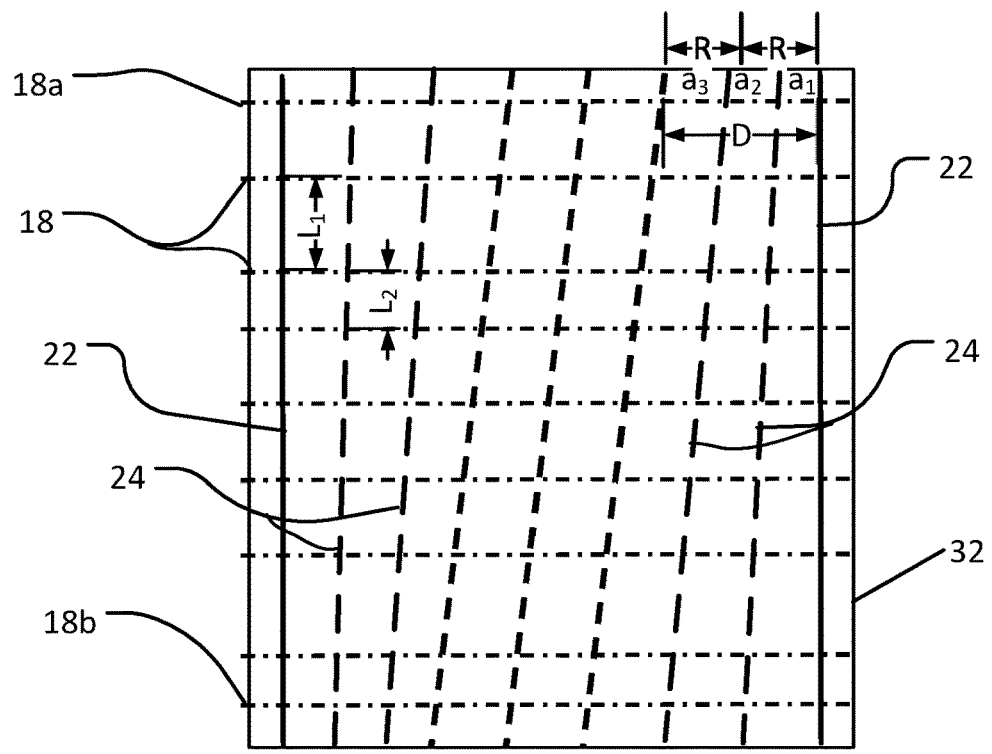
FIG. 3 schematically illustrates a variant of the noncontact support platform table shown in FIG. 2, in which a separation distance between adjacent rows is not constant.

FIG. 3 schematically illustrates a variant of the noncontact support platform table shown in FIG. 2, in which a separation distance between adjacent rows is not constant.

In noncontact support platform table 32, row separation distance $L_1$ is greater than row separation distance $L_2$. Other pairs of adjacent rows 18 are shown with different row separation distances. In other examples of platform tables, other configurations of adjacent rows 18 may be used.

In the examples of FIGS. 1-3, the number of transition columns 24 and their spacing is identical at both lateral sides of the platform table. In some cases, the number N of transition columns 24, the separation distance D between a longitudinal column 22 and its proximal rotated column 20, or both, may be different on different lateral sides of the platform table.

Figure 4A:
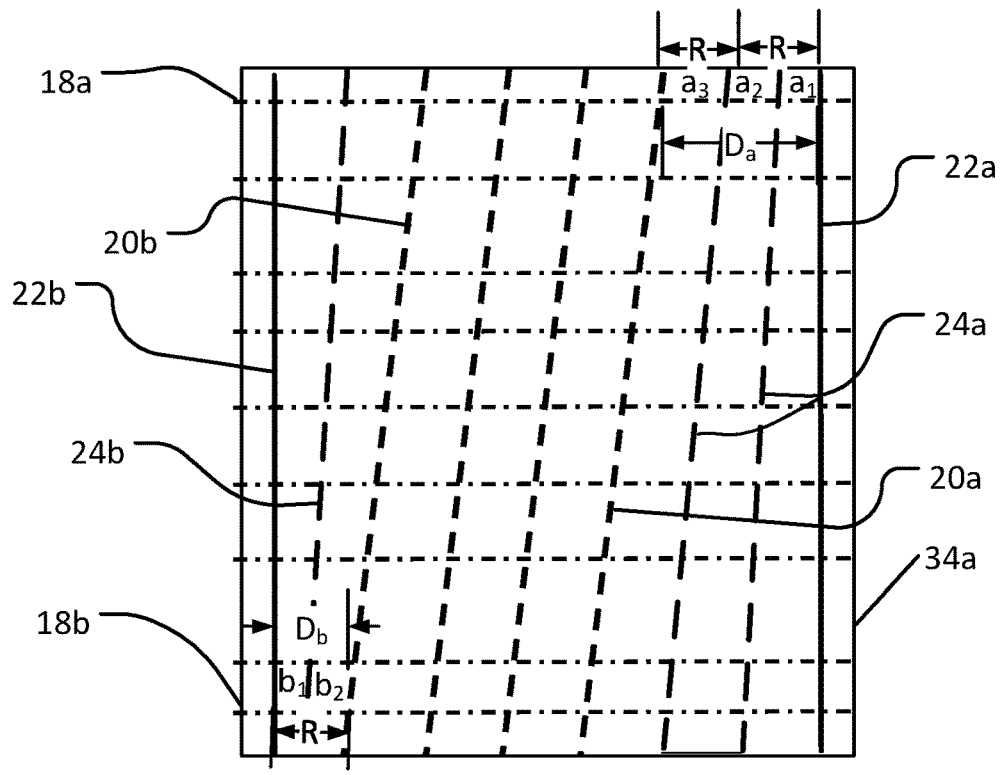
FIG. 4A schematically illustrates a variant of the noncontact support platform table shown in FIG. 3, in which different numbers of transition columns are inserted at different lateral sides of the table.

FIG. 4A schematically illustrates a variant of the noncontact support platform table shown in FIG. 3, in which different numbers of transition columns are inserted at different lateral sides of the table.

On noncontact support platform table 34a, two transition columns 24a are inserted between longitudinal column 22a and proximal rotated column 20a ($N_a=2$). A single transition column 24b is inserted between longitudinal column 22b and proximal rotated column 20b ($N_b=1$).

On noncontact support platform table 34a, the separation distance $D_a$ between the intersection of longitudinal column 22a with end row 18a and the intersection of proximal rotated column 20a with end row 18a is equal to twice the column separation distance R ($D_a=2R$). Thus, transition column separation distances $a_1+a_2+a_3=2R$. On the other hand, the separation distance $D_b$ between the intersection of longitudinal column 22b with end row 18b and the intersection of proximal rotated column 20b with end row 18b is equal to the column separation distance R ($D_b=R$). Thus, transition column separation distances $b_1+b_2=R$.

Figure 4B:
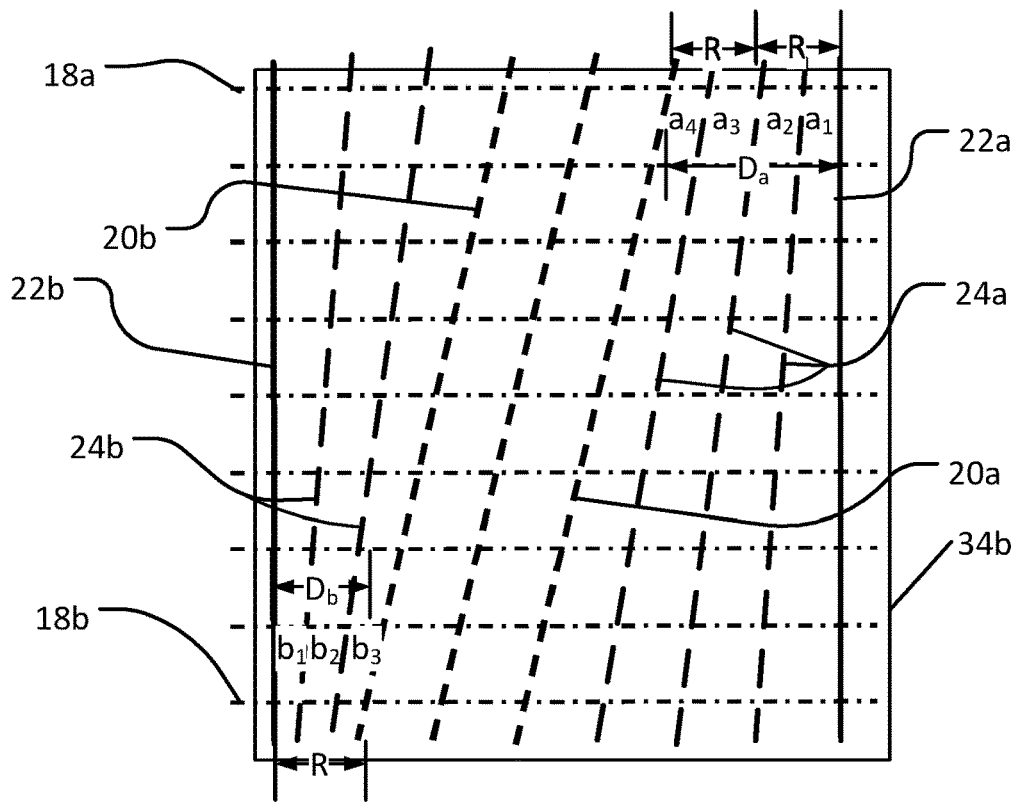
FIG. 4B schematically illustrates a variant of the noncontact support platform table shown in FIG. 4A.

FIG. 4B schematically illustrates a variant of the noncontact support platform table shown in FIG. 4A.

On noncontact support platform table 34b, three transition columns 24a are inserted between longitudinal column 22a and proximal rotated column 20a ($N_a=3$). Two transition columns 24b are inserted between longitudinal column 22b and proximal rotated column 20b ($N_b=2$).

On noncontact support platform table 34b, the separation distance $D_a$ between the intersection of longitudinal column 22a with end row 18a and the intersection of proximal rotated column 20a with end row 18a is equal to twice the column separation distance R ($D_a=2R$). Thus, transition column separation distances $a_1+a_2+a_3+a_4=2R$. On the other hand, the separation distance $D_b$ between the intersection of longitudinal column 22b with end row 18b and the intersection of proximal rotated column 20b with end row 18b is equal to the column separation distance R ($D_b=R$). Thus, transition column separation distances $b_1+b_2+b_3=R$.

In the examples of FIGS. 1-4B, longitudinal columns 22 include a single longitudinal column 22 near each lateral side of the noncontact support platform table. In other examples, one or more longitudinal columns may be placed at other locations.

Figure 5:
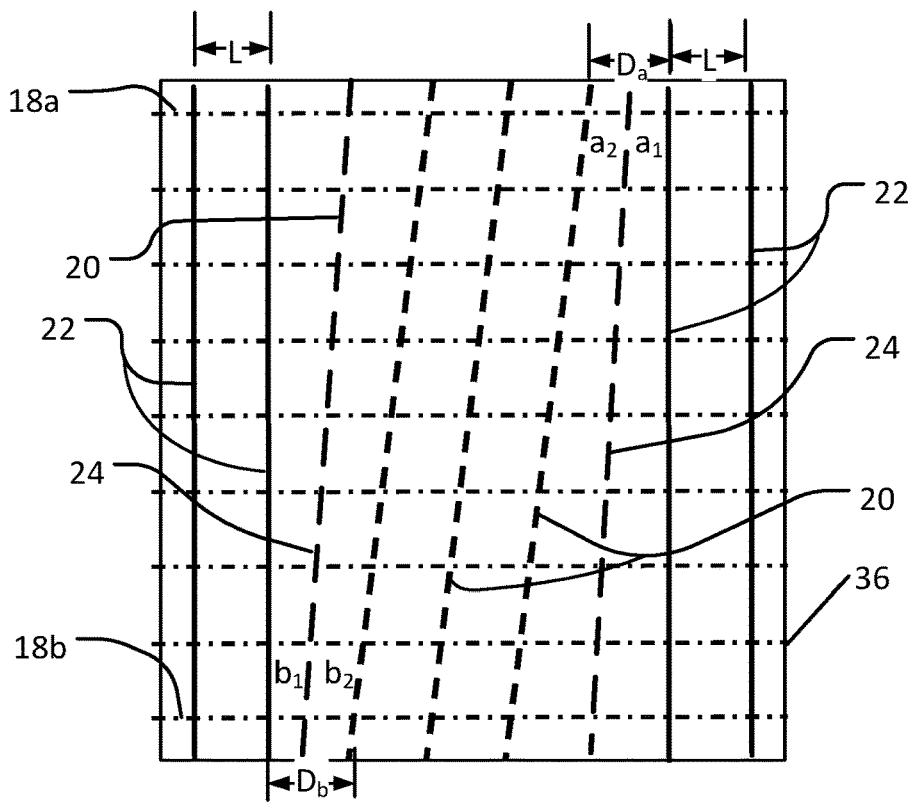
FIG. 5 schematically illustrates a variant of the table top of a noncontact support platform shown in FIG. 1, in which more than one longitudinal column is located at each lateral side of the table.

FIG. 5 schematically illustrates a variant of the table top of a noncontact support platform shown in FIG. 1, in which more than one longitudinal column 22 is located at each lateral side of the table.

On noncontact support platform table 36, pairs of adjacent longitudinal columns 22 are located along each lateral side of noncontact support platform table 36. In other examples, an arrangement of more than two adjacent transition columns 24 may be present.

In the example shown, the lateral separation distance L between the adjacent longitudinal columns 22 is approximately equal to column separation distance R. In other examples, $L>R$ or $L<R$. One or more transition columns 24 (one, in the example shown) may be placed between the innermost longitudinal column 22 of each pair (or set of more than two) of longitudinal columns 22 and the most proximal rotated column 20. In other examples, other configurations of transition columns 24, e.g., variants of the configurations shown in FIGS. 2-4B or other configurations, may be located between the innermost longitudinal column 22 on each lateral side of noncontact support platform table 36 and the outermost rotated columns 20.

Figure 6:
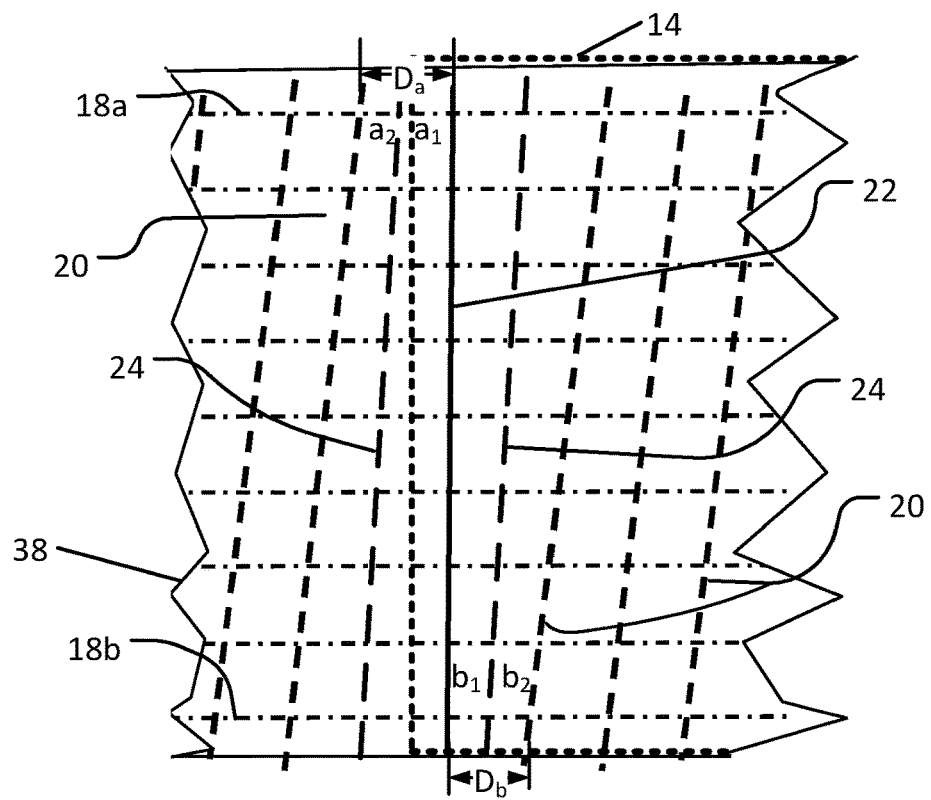
FIG. 6 schematically illustrates a variant of the table top of a noncontact support platform shown in FIG. 1, in which rotated columns and transition columns are located on both sides of a longitudinal column.

FIG. 6 schematically illustrates a variant of the table top of a noncontact support platform shown in FIG. 1, in which rotated columns and transition columns are located on both sides of a longitudinal column.

Noncontact support platform table 38 includes a longitudinal column 22 that is not located near either lateral side of noncontact support platform table 38. (The lateral sides of noncontact support platform table 38 are not shown in FIG. 6, which schematically illustrates an interior region of noncontact support platform table 38.) A typical noncontact support platform table 38 may include one or more additional longitudinal columns (not shown in FIG. 6) located elsewhere on noncontact support platform table 38.

For example, longitudinal column 22 may be located at an expected location of a lateral edge of at least one type of workpiece 14 that is expected to be supported by noncontact support platform table 38, or for which noncontact support platform table 38 is designed. Alternatively or in addition, longitudinal column 22 may be located at a location that is expected or designed to support an interior longitudinal region of a workpiece 14. Typically, a noncontact support platform table similar to noncontact support platform table 38 may have several longitudinal columns, e.g., near lateral edges of noncontact support platform table 38, at expected edges of one or more types of workpiece 14, or elsewhere.

On noncontact support platform table 38, rotated columns 20 are located on both sides of longitudinal column 22. Therefore, transition columns 24 are also located on both sides of longitudinal column 22 between longitudinal column 22 and rotated columns 20. Each transition column 24 may be configured similarly to a transition column that is located near a lateral side of noncontact support platform table 38, e.g., as shown in one of FIGS. 2-4B, or another configuration.

Figure 7:
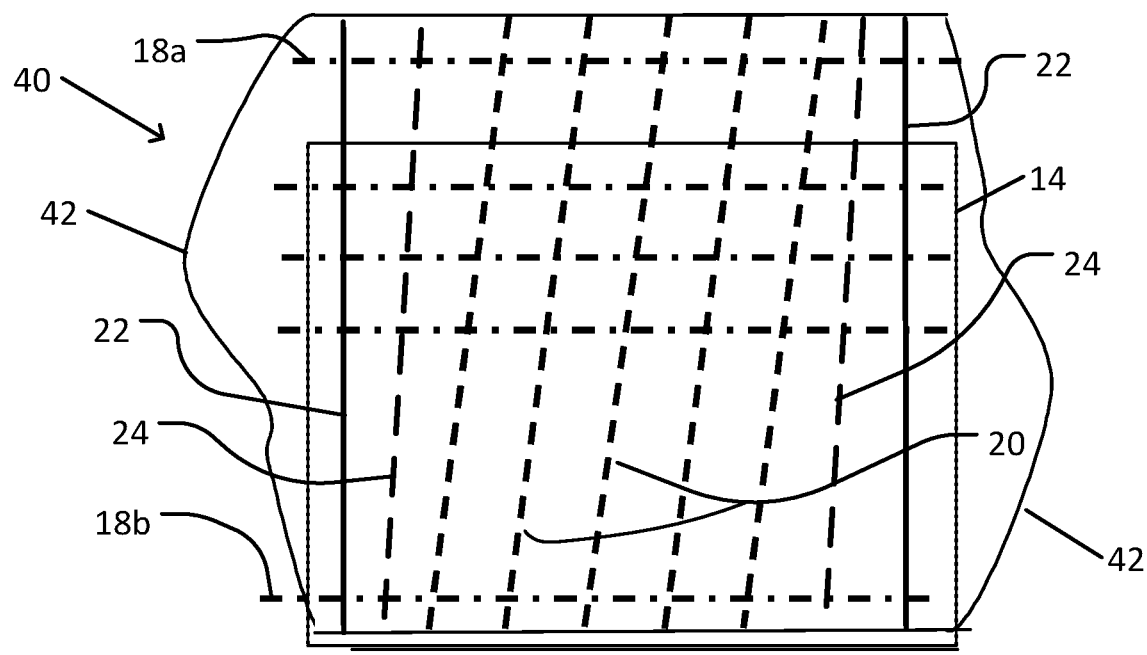
FIG. 7 schematically illustrates a variant of the table top of a noncontact support platform shown in FIG. 1, having nonparallel lateral sides.

FIG. 7 schematically illustrates a variant of the table top of a noncontact support platform shown in FIG. 1, having nonparallel lateral sides.

Noncontact support platform table 40 includes nonparallel lateral sides 42. In the example shown, nonparallel lateral sides 42 are shown as arbitrarily curved for illustrative purposes. However, in a typical noncontact support platform table, a nonparallel lateral side 42 may have a more regular shape, e.g., inclined line segment, circular arc, section of oval or other regular curve, section of perimeter of a polygonal, or another regular shape.

In the example shown, longitudinal columns 22 are located near lateral edges of a workpiece 14, regardless of the shapes of nonparallel lateral sides 42. Locations of transition columns 24 between each longitudinal column 22 and rotated columns 20 may as shown (similar to the location of transition columns 24a and 24b in FIG. 1), or may be otherwise (e.g., similar to the location of transition columns 24 in any of FIGS. 2-4A, or otherwise).

Figure 8:
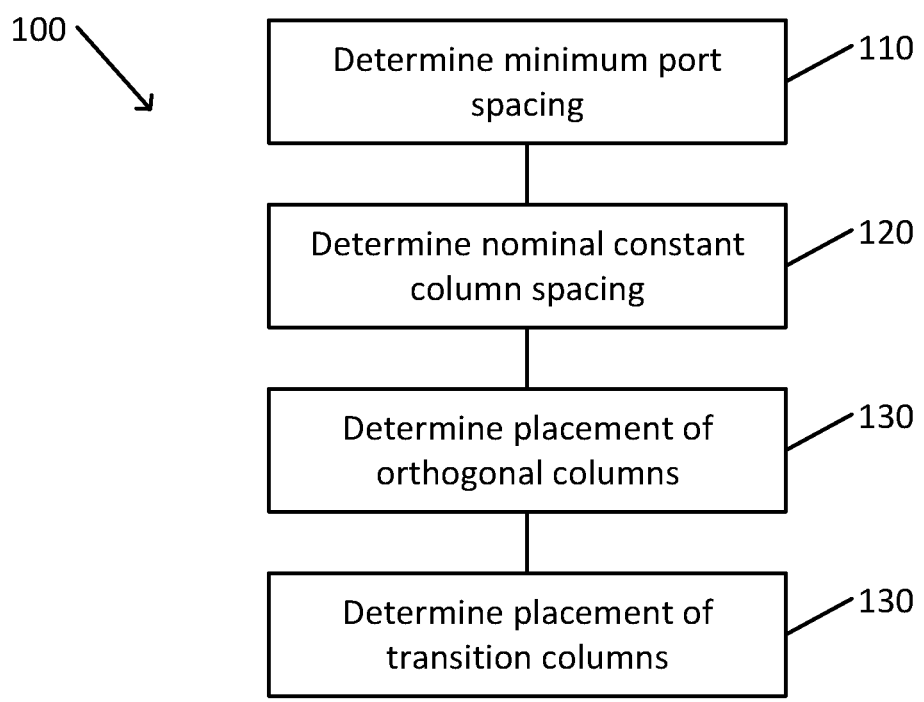
FIG. 8 is a flowchart depicting a method of designing placement of air ports on a table top of a noncontact support platform, in accordance with an embodiment of the present invention.

FIG. 8 is a flowchart depicting a method of designing placement of air ports on a table top of a noncontact support platform, in accordance with an embodiment of the present invention.

It should be understood, with respect to any flowchart referenced herein, that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Noncontact support platform table design method 100 may be executed by a processor or designer that is designing placement of pressure ports 28 and vacuum ports 26 on a table top of a noncontact support platform table 12 (to be understood as representing any variants of noncontact support platform table, e.g., as shown in FIGS. 2-7, or otherwise). In general, along each row or column of ports, pressure ports 28 alternate with vacuum ports 26.

A minimum distance (e.g., center-to-center) distance between adjacent ports may be determined (block 110). For example, a minimum distance between adjacent ports (typically between a pressure port 28 and an adjacent vacuum port 26) may be limited by the size of the ports, strength of the materials that form the walls between adjacent ports, arrangement of conduits connecting each port to a source of pressure or suction, or other considerations. Fluid dynamics calculations indicate that the strength of an air cushion between a noncontact support platform table 12 and a supported workpiece 14 depends primarily on the diameter of the ports. Therefore, a diameter of pressure ports 28 and vacuum ports 26 may be selected on the basis of such fluid dynamics considerations, and a minimum distance between adjacent ports may likewise be determined based on various engineering or design considerations based on the diameters. The minimum distance may be utilized in determining a maximum number of transition columns 24 that may be inserted between a longitudinal column 22 and a proximal rotated column 20.

A nominal spacing distance between adjacent columns of ports, e.g., between adjacent rotated columns 20, may be determined (block 120). The spacing may be determined on the basis of fluid dynamics calculations, cost considerations (e.g., cost of machining ports), or other considerations. This nominal spacing (e.g., column separation distance R) may be adhered to as much as possible throughout noncontact support platform table 12, e.g., except in the vicinity of transition columns 24, or near other special features in the platform, e.g., near an opening in the platform for use by a sensor or a workpiece-lifting mechanism.

In some cases, distances between adjacent rows 18 may be similarly determined.

Locations for placement of longitudinal columns 22 may be determined (block 130). For example, longitudinal columns 22 may be placed near a lateral edge of noncontact support platform table 12, near an expected lateral edge of a workpiece 14, or elsewhere on noncontact support platform table 12. Distances between a longitudinal column 22 and a proximal rotated column 20 at end rows 18a and 18b may or may not be integer multiples of the nominal column spacing (e.g., of column separation distance R).

Placement of transition columns 24 between each longitudinal column 22 and proximal rotated columns 20 may be determined (block 140). A number of transition columns 24 that may be inserted between an longitudinal column 22 and a rotated column 20 may be limited by the minimum port spacing (determined during the operation of block 110) and the spacing D between each longitudinal column 22 and its proximal rotated columns 20 (e.g., as determined during the operation of block 130), e.g., at one of end rows 18a or 18b where the intersection with an longitudinal column 22 is nearest to the intersection with the proximal rotated column of rotated columns 20. Typically, the spacing between adjacent columns (e.g., between a transition column 24 and another transition column 24, a longitudinal column 22, or a proximal rotated column 20) at the opposite end row 18b or 18a, respectively, may be designed to be equal to the nominal column spacing, e.g., column separation distance R. Thus, the spacing values and placements determined in the operations of blocks 110-130 may be utilized to determine placement of transition columns 24.

In some cases, other considerations may be utilized in determining placement of transition columns 24.

It may be noted with respect to noncontact support platform table design method 100 that, in particular, the ordering of the operations represented by blocks 110-130 may be modified without affecting results of execution of noncontact support platform table design method 100.

In accordance with an embodiment of the present invention, a noncontact support platform table may include pressure ports that are interspersed with evacuation ports that are open to atmospheric pressure without applied suction (PA noncontact support platform). On such a table, placement of transition columns may be less constrained than on a table with pressure and vacuum ports (PV noncontact support system). For example, a transition column need not extend from one end row to the other, and thus may be shorter than the neighboring longitudinal columns and rotated columns. For example, locations of the ends of the transition columns may be limited by one or more considerations including geometric considerations (e.g., radius or size of each port, or of structure, such as conduits, valves, or other structure, that is related to the port), engineering considerations (e.g., strength and properties of material separating the ports), economic (e.g., costs of precision machining), or other considerations.

Figure 9:
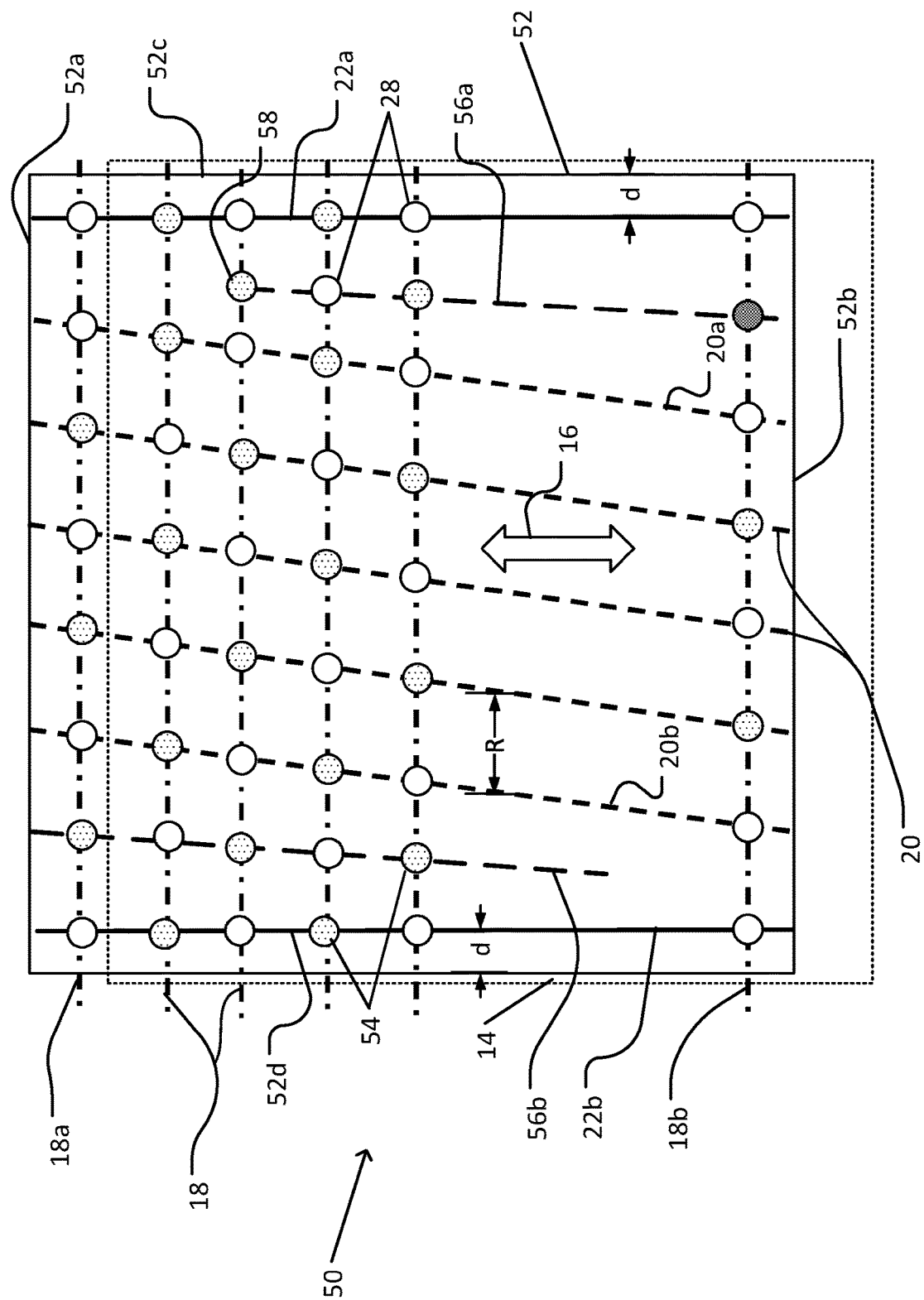
FIG. 9 schematically illustrates an arrangement of pressure ports and evacuation ports on a table top of a noncontact support platform, in accordance with an embodiment of the present invention.

FIG. 9 schematically illustrates an arrangement of pressure ports and evacuation ports on a table top of a noncontact support platform, in accordance with an embodiment of the present invention.

Noncontact support platform table 52 of noncontact support platform 50 includes a plurality of pressure ports 28 that are each connected to a pressure source. A plurality of evacuation ports 54 are interspersed with pressure ports 28. Each evacuation port 54 is open, e.g., via one or more tubes, channels, conduits, manifolds, or other structure, to the ambient atmosphere.

Pressure ports 28 and evacuation ports 26 are arranged in a plurality of rows 18 that are oriented substantially perpendicular to direction of motion 16 of workpiece 14. Along rows 18 (except, possibly, along end rows 18a and 18b, and rows 18 that neighbor rows 18), pressure ports 28 are alternated with evacuation ports 54, such that each pair of nearest evacuation ports 54 along a row 18 is separated by a pressure port 28, and each pair of nearest pressure ports 28 is separated by an evacuation port 54.

End rows 18a and 18b are located at longitudinal sides 52a and 52b, respectively, of noncontact support platform table 52. In the example shown, all pairs of adjacent rows 18 are separated by an identical row separation distance L. In other examples, the row separation distance may vary for at least some pairs of adjacent rows 18.

Each evacuation port 54 and pressure port 28 is located at an intersection between a row 18 and a column. The columns include longitudinal columns 22, rotated columns 20, and transition columns 56 (e.g., transition columns 56a and 56b). Along each column, pressure ports 28 are alternated with evacuation ports 26, such that each pair of nearest evacuation ports 26 along a column is separated by a pressure port 28, and each pair of nearest pressure ports 28 is separated by an evacuation port 26.

Rotated columns 20 are mutually parallel and equally spaced such that adjacent rotated columns 20 are separated by column separation distance R. Each rotated column 20 is oriented at an oblique angle to direction of motion 16. Rotated columns 20 are spaced between proximal rotated column 20a, located closest to lateral side 52c of noncontact support platform table 52, and proximal rotated column 20b, located closest to lateral side 52d.

In the example shown, each of longitudinal columns 22a and 22b is located at a distance d from an adjacent to lateral side 52c or 52d, respectively, of noncontact support platform table 52. In other examples, longitudinal columns 22 may be located elsewhere on noncontact support platform table 52. Each longitudinal column 22a or 22b is oriented substantially parallel to direction of motion 16.

In the example shown, a single transition column 56a or 256b (N=1) is located between each longitudinal column 22a or 22b and its proximal rotated column 20a or 20b, respectively. In other examples, two or more transition columns 56 may be located between a longitudinal column and its proximal rotated column. Each transition column 56 has an orientation that is intermediate between that transition column 56 and the two columns that are adjacent to that transition column 56 (e.g., a longitudinal column 22 and a proximal rotated column 20 as in the example shown, two other transition columns 56, or another transition column 56 and either a rotated column 20 or a longitudinal column 22).

In the example shown, transition column 56a terminates at port 58 and does not extend to end row 18a (as do rotated columns 20 and longitudinal columns 22). Similarly, transition column 56b does not extend to end row 18b. The gap between each transition column 56a or 56b and the end row 18a or 18b, respectively, may be the result of various design considerations. Typically, such a gap does not affect performance (e.g., precision of a thickness of an air cushion between noncontact support platform table 52 and workpiece 14) of noncontact support platform 50 (the performance of a PA, as discussed above, being in any event less precise than the performance of a PV support table).

It may be noted that, along a row 18 that is not intersected by a transition column 56a or 56b, adjacent ports along such a row 18 may include two adjacent pressure ports 28 or two adjacent evacuation ports 54.

It should be understood, that variants of noncontact support platform table 52, e.g., analogous to the variants of noncontact support platform table 12 that are schematically shown in FIGS. 2-7 and other variants as described above, are possible with regard to noncontact support platform table 52. In all these variants, a transition column 24 need not extend to an end row 18a or 18b.

Different embodiments are disclosed herein. Features of certain embodiments may be combined with features of other embodiments; thus, certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A noncontact support platform system that is configured to support a workpiece, the system comprising:
    a plurality of pressure ports and vacuum ports that are interspersed on a top surface of a table, each pressure port configured to connect to a source of air pressure to enable an outflow of air through that pressure port, and each vacuum port configured to connect to a source of suction to enable an inflow of air through that vacuum port, the pressure ports and vacuum ports arranged along a plurality of columns such that a pressure port of the plurality of pressure ports alternates with a vacuum port of the plurality of vacuum ports along each column of the plurality of columns, wherein the plurality of columns comprises:
        at least one longitudinal column that is oriented substantially parallel to a direction of motion of the workpiece over the table;
        a plurality of mutually parallel rotated columns that are each oriented at an oblique angle to the direction of motion; and
        at least one transition column located between said at least one longitudinal column and a proximal rotated column of said plurality of rotated columns, each transition column of said at least one transition column oriented at an orientation that is intermediate between the two columns of the plurality of columns that are adjacent to that transition column,
    wherein each of the vacuum ports and each of the pressure ports is located at an intersection of a column of the plurality of columns with a row of a plurality of rows that are each oriented substantially perpendicular to the direction of motion, such that a pressure port of the plurality of pressure ports alternates with a vacuum port of the plurality of vacuum ports along each row of the plurality of rows.

2. The system of claim 1, wherein a distance R between a pair of adjacent rotated columns of the plurality of rotated columns is substantially equal to a distance between any other pair of adjacent rotated columns of the plurality of rotated columns.

3. The system of claim 2, wherein a distance between an intersection of said at least one longitudinal column with an end row of the plurality of rows and an intersection of a proximal rotated column of the plurality of rotated columns is equal to an integral multiple of the distance R.

4. The system of claim 1, wherein a minimum distance between an intersection of each transition column of said at least one transition column with an end row of the plurality of rows and an intersection with that end row of a column of said plurality of columns that is adjacent to that transition column is limited by a minimum allowed spacing between adjacent ports.

5. The system of claim 1, wherein the plurality of rotated columns are located between two bounding longitudinal columns of said at least one longitudinal column.

6. The system of claim 5, wherein a number of the transition columns between one bounding longitudinal column of the two bounding longitudinal columns and the rotated column of the plurality of rotated columns that is proximal to the one bounding orthogonal column is equal to a number of the transition columns between the other bounding longitudinal column and the rotated column of the plurality of rotated columns that is proximal to the other bounding longitudinal column.

7. The system of claim 5, wherein a number of the transition columns between one bounding longitudinal column of the two bounding longitudinal columns and a rotated column of the plurality of rotated columns that is proximal to the one bounding longitudinal column is different from a number of the transition columns between the other bounding longitudinal column and a rotated column of the plurality of rotated columns that is proximal to the other bounding orthogonal column.

8. The system of claim 5, wherein a distance between an intersection with a first end row of the plurality of rows with one bounding longitudinal column of the two bounding longitudinal columns and an intersection of the first end row with a rotated column of the plurality of rotated columns that is proximal to said one bounding longitudinal column is equal to a distance between an intersection with a second end row of the plurality of rows with the other bounding longitudinal column of the two bounding longitudinal columns and an intersection of the second end row with a rotated column of the plurality of rotated columns that is proximal to the other bounding longitudinal column.

9. The system of claim 5, wherein a distance between an intersection with a first end row of the plurality of rows with one bounding longitudinal column of the two bounding longitudinal columns and an intersection of the first end row with a rotated column of the plurality of rotated columns that is proximal to said one bounding longitudinal column is different from a distance between an intersection with a second end row of the plurality of rows with the other bounding longitudinal column of the two bounding longitudinal columns and an intersection of the second end row with a rotated column of the plurality of rotated columns that is proximal to said other bounding longitudinal column.

10. The system of claim 1, wherein some rotated columns of the plurality of rotated columns are located on one side of a longitudinal column of said at least one longitudinal column, and other rotated columns of the plurality of rotated columns are located on an opposite side of that longitudinal column.

11. The system of claim 1, wherein said at least one longitudinal column comprises a plurality of adjacent longitudinal columns.

12. A noncontact support platform system that is configured to support a workpiece, the system comprising:
a plurality of pressure ports and evacuation ports that are interspersed on a top surface of the table, each pressure port configured to connect to a source of air pressure to enable an outflow of air through that pressure port, and each evacuation port configured to open to ambient atmospheric pressure to enable an inflow of air through that evacuation port, the pressure ports and evacuation ports arranged along a plurality of columns such that a pressure port of the plurality of pressure ports alternates with an evacuation port of the plurality of evacuation ports along each column, each of the evacuation ports and each of the pressure ports being located at an intersection of a column of the plurality of columns with a row of a plurality of rows that are each oriented substantially perpendicular to the direction of motion, wherein the plurality of columns comprises:
at least one longitudinal column that is oriented substantially parallel to a direction of motion of the workpiece over the table;
a plurality of mutually parallel rotated columns that are each oriented at an oblique angle to the direction of motion; and
at least one transition column located between said at least one longitudinal column and a proximal rotated column of said plurality of rotated columns, each transition column of said at least one transition column oriented at an orientation that is intermediate between the two columns of the plurality of columns that are adjacent to that transition column, wherein along a row of the plurality of rows that is intersected by all transition columns of said at least one transition column, a pressure port of the plurality of pressure ports alternates with an evacuation port of the plurality of evacuation ports.

13. The system of claim 12, wherein a transition column of said at least one transition column does not intersect at least one row of the plurality of rows.

* * * * *